United States Patent
Heller et al.

[15] 3,647,932
[45] Mar. 7, 1972

[54] TRANSPOSED CONDUCTOR FOR DYNAMOELECTRIC MACHINES

[72] Inventors: Paul R. Heller, Murrysville; William C. Brenner; Harold M. Philossky, both of Pittsburgh, all of Pa.

[73] Assignee: Westinghouse Electric Corporation, Pittsburgh, Pa.

[22] Filed: Dec. 11, 1970

[21] Appl. No.: 97,278

[52] U.S. Cl. .............................. 174/34, 174/113 R, 336/187
[51] Int. Cl. ......................................................... H01b 7/30
[58] Field of Search ............... 174/33, 34, 113 R, 117 R, 115; 336/187

[56] References Cited

UNITED STATES PATENTS

| | | | |
|---|---|---|---|
| 3,280,244 | 10/1966 | Pannen | 174/34 |
| 3,118,015 | 1/1964 | Willyoung | 174/33 |
| 3,546,357 | 12/1970 | MacPherson | 174/34 |
| 3,188,377 | 6/1965 | Hughes | 174/33 |

*Primary Examiner*—Lewis H. Myers
*Assistant Examiner*—A. T. Grimley
*Attorney*—A. T. Stratton and F. P. Lyle

[57] ABSTRACT

A transposed stranded conductor for dynamoelectric machines having four stacks of strands transposed in the slot portion of the conductor in such a manner that each stack moves to different transverse positions in successive longitudinal sections of the bar such that the stacks are reversed in transverse position at opposite ends of the bar. Preferably, the strands are also transposed in a manner to cause inversion of the relative strand positions at opposite ends of the slot so that the conductor is fully transposed with inversion of strand position both transversely of the slot and depthwise of the slot.

12 Claims, 16 Drawing Figures

Patented March 7, 1972  3,647,932
2 Sheets-Sheet 1
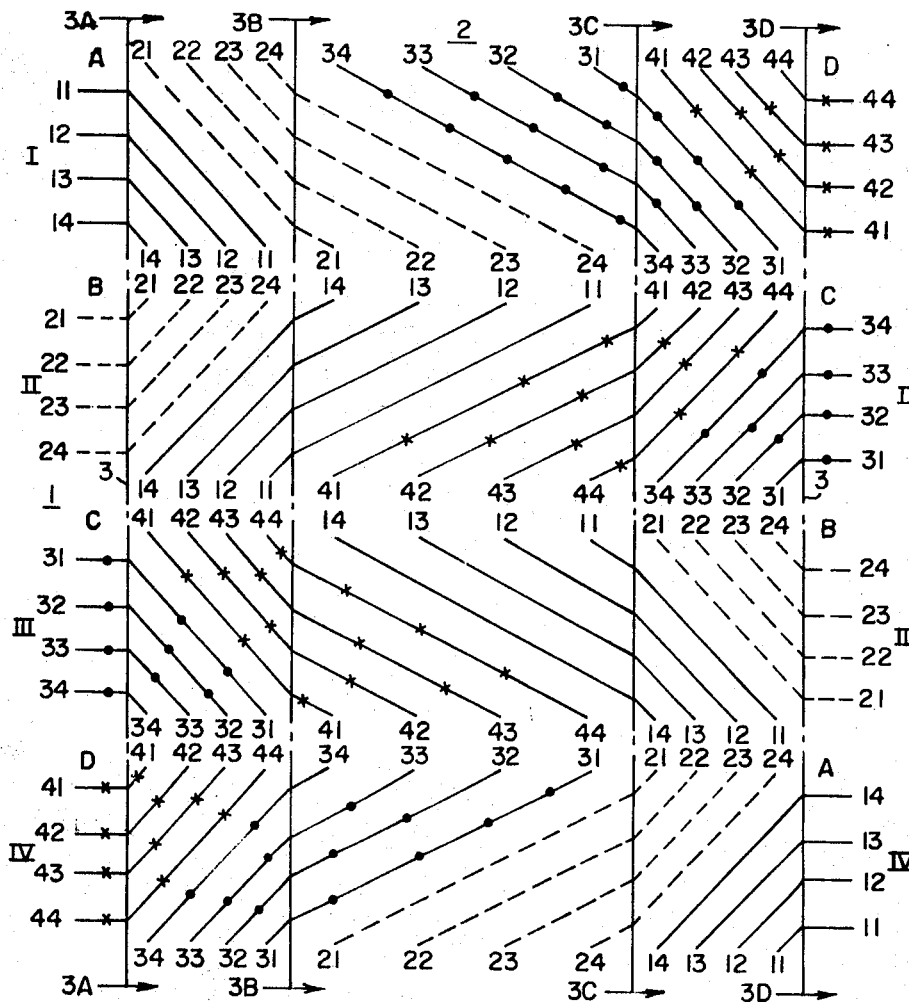
FIG. 1
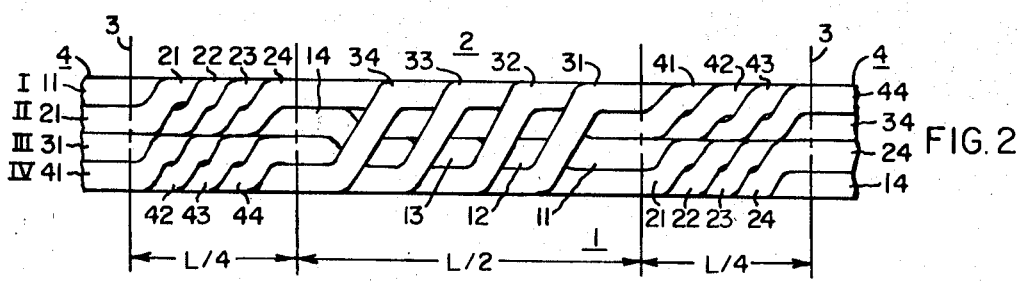
FIG. 2
FIG. 3A
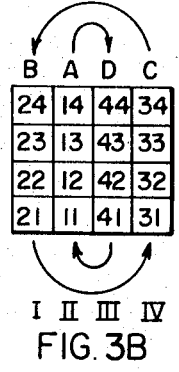
FIG. 3B
FIG. 3C
FIG. 3D

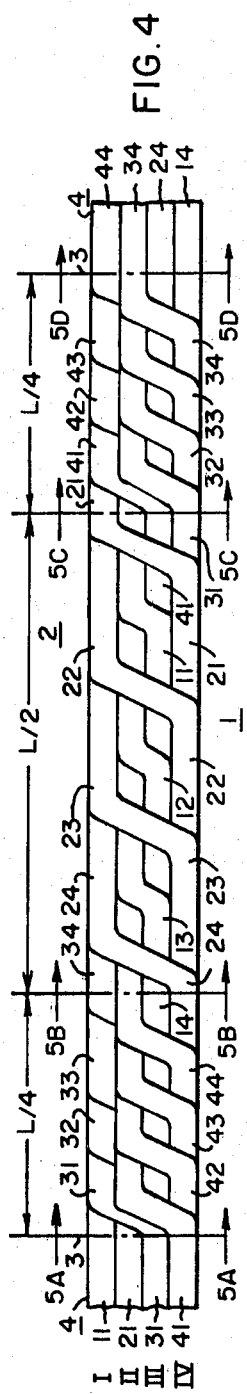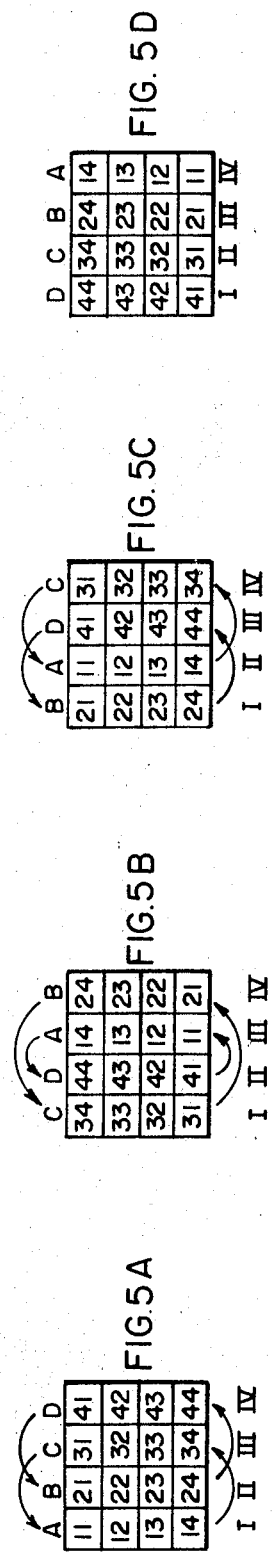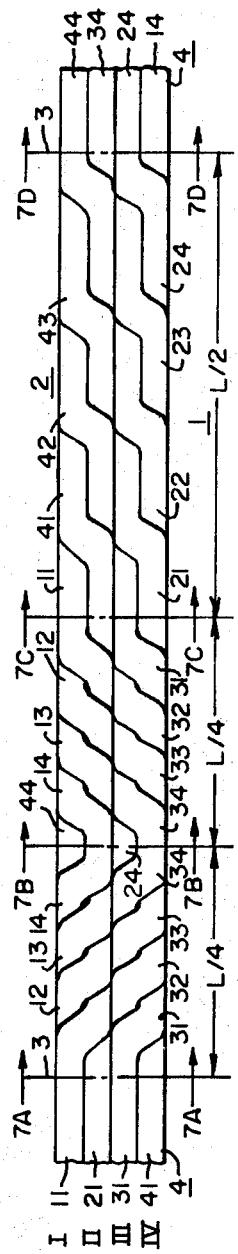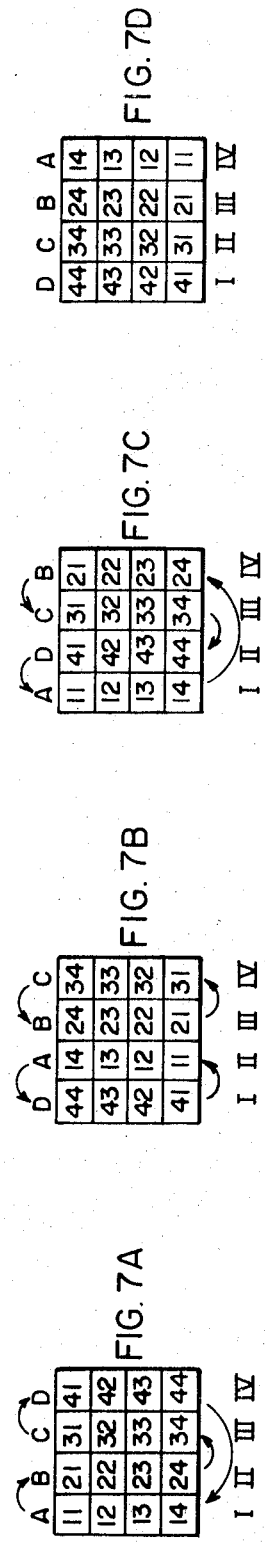

TRANSPOSED CONDUCTOR FOR DYNAMOELECTRIC MACHINES

BACKGROUND OF THE INVENTION

The present invention relates to a conductor for dynamoelectric machines, and more particularly to a transposed stranded conductor bar or half-coil for machines of large size such as turbine generators.

The winding conductors of dynamoelectric machines are placed in slots in a laminated magnetic core. When currents flow in the conductors, magnetic fluxes occur across the slots which cause induced voltages and eddy currents in the conductor. Similar fluxes link the end turn portions of the conductor outside the slot, with some additional leakage flux from the rotor, and cause similar induced voltages in the end portions. For this reason, the conductors of large machines are always of stranded construction, being built up of a substantial number of relatively thin strands to minimize the eddy current loss. The fluxes, however, are not uniform but vary radially in density so that the induced strand voltages vary from strand to strand and circulating currents due to these unbalanced voltages flow between the strands causing excessive losses and heating. For this reason, it is necessary to transpose the strands in order to cancel out as far as possible the unbalanced strand voltages to minimize the circulating currents and resultant heating.

The most commonly used type of transposition which has been in general use for many years is the so-called Roebel transposition. In this arrangement, as shown in Roebel U.S. Pat. No. 1,144,252, the strands are disposed in two side-by-side stacks and are transposed within the slot by crossovers or cranks between the stacks. In each stack, the strands are inclined so that each strand moves radially to the top or bottom of the stack, crosses over to the other stack, moves radially through the other stack and crosses over back to the first stack. Thus, looking at the end of the conductor, each strand moves through an angle of 360° in going from one end of the slot to the other, and emerges at the other end in the same relative position at which it entered the slot. Since the spacing between crossovers, or the cranking distance, is uniform throughout the length of the slot, each strand occupies all positions in the slot for equal distances and the induced strand voltages exactly balance out so that the transposition is completely balanced within the slot. The transposition within the slot, however, does not affect the induced voltages in the end portions of the conductor outside the slot which would cause circulating currents and excessive heating. In the usual practice, this problem has been overcome by dividing the strands into groups in the end portions and transposing the groups at the connections between adjacent conductor bars which form a complete coil. In this way the strand voltages in the end portions can be balanced out in a complete coil or group of coils.

In many cases in machines of large size, four stacks of strands are required in order to carry the high load currents while keeping the dimensions of the individual strands small enough to minimize eddy currents. The usual practice in such cases has been to place two conventional Roebel bars side by side in the slot to form a complete conductor with four stacks of strands. When this is done, however, the group transpositions between adjacent conductors become very difficult and cumbersome. The strands must be separated into groups in the end portions of each conductor and the groups matched with the appropriate corresponding groups in the adjacent conductors. Numerous brazing or soldering operations are then required to make the many connections between adjacent conductors and the operation is very time consuming and costly. It would be desirable, therefore, to eliminate the necessity of group transpositions and to connect all strands solidly together at each end of the conductor. Furthermore, in some cases this has become necessary. In very large generators, for example, where a liquid coolant such as water is circulated through hollow strands in the conductor, it is impractical to provide an individual water connection for each strand and a common water header or connector must be used at each end of the conductor to supply water to all the strands of the conductor. This necessarily shorts the strands together at each end and group transpositions are not possible. With the strands thus shorted together at each end of a conductor, the conventional Roebel transposition would still be balanced within the slot, but the unbalanced strand voltages in the end portions of the conductor would result in large circulating currents and excessive heating which would be too great to be tolerated.

One scheme for cancelling the unbalanced voltages in the end portions of a two-stack conductor bar has been proposed in Ringland U.S. Pat. No. 2,821,641. In this scheme the end portions of the conductor at opposite ends are inverted with respect to each other. This is done by transposing the two stacks of strands within the slot through 180° in the first quarter of the slot length, through 180° in the second and third quarters of the slot length, and through another 180° in the last quarter of the slot, making a total transposition of 540° within the slot. The end portions are thus inverted with respect to each other. The crossover spacing in the center half of the slot is made twice as great as the spacing in the first and fourth quarters so that each strand occupies all positions in the slot for equal distances and a completely balanced transposition within the slot is obtained. The inversion of the end portions with respect to each other tends to balance opposing strand voltages in the opposite end portions so that the strands can be shorted together at both ends of the conductor.

It might appear that if four stacks of strands are needed, two 540° bars could be placed side by side with all four stacks solidly joined together at both ends. In fact, however, if this is done the radial components of the flux in the end regions of the machine induce voltages in the end portions of the conductors which cause circulating currents to flow between the two paralleled bars which may be as high as 20 to 30 percent of the normal full load current. Obviously, circulating currents of this magnitude can result in excessive heating. The relatively simple solution of placing two conventional transposed conductors side by side to obtain a four-stack conductor is therefore undesirable because of the excessive eddy current loss that may be caused. One possible solution to this difficulty is shown in Pannen U.S. Pat. No. 3,280,244 where it is proposed to use a central two-stack transposed conductor bar with two other stacks of strands transposed around the first two in a concentric arrangement. Such a conductor avoids the difficulty mentioned above but the concentric arrangement has disadvantages such as the increased height of the conductor bar as compared to a single two-stack conductor. The concentric arrangement may also involve difficulties in insulating the crossover strands of the two sets of conductor stacks from each other, as well as difficulty in some cases in dissipating heat from the central two stacks which are completely surrounded and enclosed by the two outside stacks.

SUMMARY OF THE INVENTION

In accordance with the present invention, a conductor bar is provided having four stacks of strands which are transposed transversely of the slot in a manner to reverse the stack positions from one end of the slot to the other. In this way any effect of radial flux components on the end turn portions is balanced out and all four stacks of strands may be connected together at each end without causing excessive circulating currents.

This transverse or widthwise inversion of the stacks of strands is obtained by transposing them in such a manner that each stack moves as a stack to different transverse positions in successive longitudinal sections of the conductor. These changes in position may be made in any desired manner that results in the complete reversal of transverse stack positions at opposite ends of the conductor. Preferably, the stacks are also transposed in a manner to invert the relative strand positions at opposite ends of the bar so that the bar is fully transposed both depthwise or radially and widthwise or transversely of the slot. The strand transposition may be such that each strand occupies all positions in the slot for equal distances, so that a completely balanced transposition is obtained within the slot, or any other desired type of strand transposition may be used.

DESCRIPTION OF THE DRAWINGS

The invention will be more fully understood from the following detailed description of certain preferred embodiments, taken in connection with the accompanying drawings, in which:

FIG. 1 is a diagrammatic side view of a four-stack conductor embodying the invention, the four stack positions being separated for clarity of illustration;

FIG. 2 is a top view of the conductor of FIG. 1;

FIGS. 3A, 3B, 3C and 3D are diagrammatic transverse sections on the lines 3A, 3B, 3C and 3D, respectively, of FIG. 1;

FIG. 4 is a top view of a conductor bar showing another embodiment of the invention;

FIGS. 5A, 5B, 5C and 5D are diagrammatic transverse sectional views on the lines 5A, 5B, 5C and 5D, respectively, of FIG. 4;

FIG. 6 is a top view of a conductor bar showing still another embodiment of the invention; and FIGS. 7A, 7B, 7C and 7D are diagrammatic transverse sectional views on the lines 7A, 7B, 7C and 7D, respectively, of FIG. 6.

DESCRIPTION OF PREFERRED EMBODIMENTS

There is shown in FIGS. 1, 2 and 3 a conductor bar or half-coil 1 for use in a dynamoelectric machine such as a large turbine generator. The conductor 1 has a straight central slot portion 2 adapted to be received in a slot of a stator core. The slot portion 2 extends between the lines 3 which may be taken as representing the ends of a stator core of length L. The conductor 1 also has end turn portions 4 at each end which may be of any suitable configuration. The end portions 4 are only fragmentarily shown but are usually formed in a complex curve to extend circumferentially around the machine for connection to the end portion of another half coil lying in another slot.

The conductor 1 is a stranded conductor made up of a plurality of rectangular strands. The strands are arranged in four side-by-side stacks disposed in four stack positions I, II, III and IV. Four strands have been shown in each stack for the purpose of illustration although it will be understood that a much larger number of strands would normally be used in an actual conductor. It will also be understood that the strands are lightly insulated from each other, and that the conductor 1 is encased in a suitable insulating sheath to provide ground insulation for the conductor in the usual manner, although the insulation has been omitted from the drawing for clarity. Some or all of the strands may be made hollow for circulation of a liquid coolant, or other cooling means may be provided such as coolant ducts disposed between the stacks.

The four stacks of strands of which the conductor bar 1 is composed maintain their identity as they move from one end of the conductor to the other and are designated A, B, C and D in the drawing. The stack A is shown as consisting of four strands 11, 12, 13 and 14. The stack B consists of strands 21, 22, 23 and 24. The stack C consists of strands 31, 32, 33 and 34, while the stack D consists of strands 41, 42, 43 and 44.

The strands are transposed in the slot portion 2 of the conductor by crossovers between stacks in a manner somewhat similar to that of the usual Roebel transposition, although the crossovers are not made between adjacent stacks in all instances. In order to make clear how the transpositions are made, the four stack positions I, II, III and IV are shown separated in FIG. 1 and the strands of each stack are represented by distinctively different types of lines, so that each individual strand can readily be followed from one stack position to another as it goes from one end of the conductor to the other.

In the illustrated embodiments of the invention, the slot length L of the conductor 1 is divided into a first longitudinal section of length equal to one-fourth the slot length, a second longitudinal section having a length equal to one-half the total length L, and a third longitudinal section having a length equal to one-fourth the total length, as shown in FIG. 1. The transposition is effected in such a manner that each stack of strands moves as a stack to different transverse positions in the conductor in the successive longitudinal sections of the conductor.

In the embodiment of the invention shown in FIGS. 1, 2 and 3, starting at the left-hand end of the conductor, the strands are transposed 180° in the first section in a manner to move the strands from the configuration of FIG. 3A to that of FIG. 3B, that is, the transposition is made in such a manner that stacks A and B change places and stacks C and D change places, the movement of the stacks being as indicated by the arrows in FIG. 3A. The disposition of the individual strands to effect this change in position of the stacks can be clearly seen in FIGS. 1 and 2. Thus, for example, strands 12 and 13, which are shown by solid lines, can be seen to move downward in stack position I until they reach the bottom of the conductor where they cross over under the conductor to stack position II and then move upward to the position corresponding to the section 3B, at which point they have moved 180° from their original positions at the beginning of the slot. The other strands can similarly be followed in FIGS. 1 and 2 and it will be seen that each stack of strands moves as a stack from its original position to a different position transversely of the conductor.

In the second longitudinal section of the conductor, extending from section 3B to section 3C, the strands are transposed in such a manner that the stacks move from the positions of FIG. 3B to those of FIG. 3C; that is, stacks A and D change places and stacks B and C change places as indicated by the arrows in FIG. 3B. Referring again to the illustrative strands 12 and 13 in FIGS. 1 and 2, these strands move up in stack position II to the top of the conductor, cross over the top to stack position III and move down to their positions at section 3C, where they have been transposed 180° from section 3B. The movement of the other strands may similarly be followed in FIGS. 1 and 2.

In the third longitudinal section of the conductor, corresponding to the last quarter of the slot length, the stacks are transposed in the manner shown by the arrows in FIG. 3C such that the stacks C and D change places and the stacks A and B change places. This results in the final positions of the four stacks, shown in FIG. 3D, which are reversed from their initial positions of FIG. 3A at the opposite end of the conductor. The illustrative strands 12 and 13 can again be followed in FIG. 1. These strands move down in stack position III from section 3C to the bottom of the conductor, cross over to stack position IV and move up to the end of the slot where they emerge into the end portion 4 as shown. The other strands can similarly be followed through the four stack positions to effect the complete reversal of position of the stacks.

It will be noted that the individual strands have been transposed 180° in the first section of the conductor, 180° in the second section, and 180° in the third section for a total transposition of 540°, so that the strands of each stack are inverted in relative position at opposite ends of the conductor as can be seen in FIGS. 3A and 3D. As shown in FIGS. 1 and 2, the crossover spacing in the central section of the conductor is made twice the spacing in the two end sections so that each strand, in this embodiment of the invention, occupies all positions in the slot for equal distances as it passes through the different stack positions. The transposition is completely balanced, therefore, and the strands are inverted in position both depthwise or radially of the slot and transversely or widthwise of the slot at opposite ends. All four stacks of strands therefore can be solidly joined together at each end of the conductor, and no undesirable eddy currents will occur since the induced voltages are substantially balanced out both in the slot and in the end portions.

It will be apparent that the particular pattern of transverse shifting of the stacks of strands from one longitudinal section of the conductor to the next shown in FIG. 1 is not the only possible pattern. FIGS. 4 and 5 show another embodiment of the invention which is generally quite similar to that previously described but with a somewhat different pattern of transposition. These Figures correspond to FIGS. 2 and 3 described above and the same reference numerals are used.

In this embodiment of the invention, the strand transpositions from one stack position to another are made generally as described for the previous embodiment but the pattern of movement of the stacks is somewhat different. Thus, in the first longitudinal section of the conductor at the left, the stacks A and C change positions with each other and the stacks B and D change positions, as shown by the arrows in FIG. 5A, resulting in the configuration of FIG. 5B at the end of the first section. The disposition of the individual strands from one stack position to another is generally similar to that of FIG. 1 and is clearly indicated in FIG. 4. In the second section of the conductor, the stacks A and D change positions and the two outside stacks B and C change positions, as indicated in FIG. 5B, resulting in the configuration of FIG. 5C. As in the previous embodiment, this section of the conductor is twice the length of each of the two end sections and the crossover spacing is therefore made twice as great as the spacing in the end sections, as can be seen in FIG. 4. In the final longitudinal section at the right of the conductor, the stacks B and D change positions and the stacks A and C change positions as shown by the arrows in FIG. 5C, to reach the final configuration of FIG. 5D, in which the positions of the stacks have been reversed from their positions at the opposite end of the conductor. The individual strands move through the stack positions, and crossover from one stack position to another, in essentially the same manner as in FIG. 1. It will be seen that the effect of this embodiment of the invention is the same as that of the previously described embodiment with the four stacks of strands inverted both radially and transversely of the slot at opposite ends.

In both of the embodiments of the invention so far described one section of the conductor has a concentric configuration, that is, one pair of stacks of strands is transposed around another pair. Such an arrangement may have disadvantages in some cases, such as the extra insulation required between the crossovers of the different pairs of stacks or the somewhat increased height of the concentric section.

FIGS. 6 and 7 show another embodiment of the invention in which the conductor has no concentric section. These figures correspond generally to FIGS. 2 and 3 and the same reference numerals are again used. In this embodiment of the invention, starting at the left, the stacks of strands are transposed in the first section of the conductor so that three of the stacks each move to the adjacent stack position while the fourth stack moves from one outside position to the other. That is, as illustrated in FIG. 7A, stack A is transposed from position I to position II, replacing stack B. Stack B moves to position III replacing stack C, and stack C moves to position IV replacing stack D, while stack D moves from position IV to position I. The transpositions are made in the directions of the arrows in FIG. 7A, the strands of stack D crossing over the bottom of the conductor from position IV to position I, and the other stacks each moving to the adjacent position, as indicated, to arrive at the positions of FIG. 7B. The first section of the conductor is made equal in length to one-fourth of the slot length L and the strands of each stack are transposed through 180° in this section. The manner in which the individual strands are transposed is clearly indicated in FIG. 6 and is generally as shown in FIG. 1.

In the second longitudinal section of the conductor, which is also equal to one-fourth of the slot length L, the transpositions are made as shown by the arrows in FIG. 7B, with stacks D and A changing places and stacks B and C changing places. In this section the direction of transposition is reversed with respect to the direction of transposition in the first section, as indicated by the arrows in FIG. 7B and as clearly seen in FIG. 6. The strands are again transposed through 180° which results in putting them into the configuration shown in FIG. 7C.

In the last longitudinal section, which is made equal to one-half the total slot length, the transposition is made in a manner similar to that of the first section by moving each stack to the adjacent position, but in the same direction as in the second section. As shown by the arrows in FIG. 7C, stack D moves to the first position, stack C moves from position III to position II, stack B moves from position IV to position III, and stack A moves from position I to position IV, the strands of stack A crossing over the bottom of the entire conductor. The strands are again transposed through 180° in this section and the final configuration shown in FIG. 7D is obtained in which the stacks are reversed in position widthwise of the conductor and the strands are also inverted in relative position at opposite ends of the conductor. Since the crossover spacing is made twice as great in the last section of the conductor as in the other two sections, as can be seen in FIG. 6, a completely balanced 540° transposition is obtained.

It will be seen that in this embodiment of the invention, because of the pattern in which the stacks of strands are moved between successive sections of the conductor, all crossovers between the outside stack positions are made across the bottom of the conductor and there is no concentric section which is an advantage in many cases. It will also be seen that other modifications of this embodiment are possible with the long crossover between outside positions across either the top of the conductor or across the bottom in different longitudinal sections and with no concentric section.

It will be apparent that although certain specific arrangements have been shown and described for the purpose of illustration, other patterns of transposition may be employed to effect shifting of the separate stacks of strands from one transverse position to another as they move from one end of the conductor to the other in such as manner as to obtain reversal in position at opposite ends. It is also pointed out that the particular manner of transposing the individual strands shown is not the only possible method of transposition. Thus in all three embodiments described above, a complete 540° transposition of the strands is shown, resulting in a completely balanced transposition within the slot. The invention, however, is not limited to this particular type of transposition but is applicable to other arrangements such for example as that shown in a copending application of W. C. Brenner, Ser. No. 22,474, filed Mar. 25, 1970, and assigned to the assignee of the present invention. In that application there is shown and described a type of transposition in which untransposed sections are provided in the slot portion of the conductor in such a manner that induced voltages in the end turns are compensated and circulating currents and localized overheating in the strands are substantially eliminated. It will be apparent that the present invention can be applied to provide a four stack conductor bar with a transposition of this type, or with any type of strand transposition where widthwise inversion of a plurality of stacks of strands is desired. It will also be apparent that while four stacks of strands have been shown, the invention is not limited to a specific number of stacks of strands but in general is applicable to any conductor having an even number of stacks of strands greater than two.

It should now be apparent that a transposed conductor has been provided in which any number of stacks of strands can be used and solidly connected together at the ends of the conductor without causing undesirable eddy currents and excessive losses and heating. This is accomplished in a relatively simple manner by transposing stacks of strands in a predetermined pattern such that the stacks move as stacks to different transverse positions in successive longitudinal sections of the conductor to effect complete reversal in transverse position at opposite ends of the conductor. It will be apparent that this arrangement can be applied to strand transpositions of any desired type and that while certain specific embodiments of the invention have been shown and described for the purpose of illustration it is not limited to these particular embodiments but includes all equivalent embodiments, and modifications.

We claim:

1. A conductor bar for a dynamoelectric machine having a straight central slot portion and two end portions, said conductor bar comprising a plurality of strands disposed in an even number of side-by-side stacks greater than two, said strands being transposed in the slot portion by successive crossovers from one stack position to another, each stack of strands moving to different positions transversely of the bar in different successive longitudinal sections of the bar such that the stacks are reversed in transverse positions at opposite ends of the bar.

2. A conductor bar as defined in claim 1 in which the strands of each stack are inverted in relative positions at opposite ends of the bar.

3. A conductor bar as defined in claim 1 in which the strands are transposed so as to occupy all positions in the bar for substantially equal distances.

4. A conductor bar for a dynamoelectric machine having a straight central slot portion and two end portions, said conductor bar comprising a plurality of strands disposed in four side-by-side stacks, said strands being transposed in the slot portion by successive crossovers from one stack position to another, each stack of strands moving as a stack to different positions transversely of the bar in different successive longitudinal sections of the bar in such a manner that the stacks are reversed in transverse position at opposite ends of the bar.

5. A conductor bar as defined in claim 4 in which the strands of each stack are inverted in relative position at opposite ends of the bar.

6. A conductor bar as defined in claim 5 in which the strands are transposed so that each strand occupies all positions in the bar for substantially equal distances.

7. A conductor bar as defined in claim 4 in which each of said stacks of strands moves from one transverse position to another in a first longitudinal section of the bar, each stack moves to another transverse position in a second longitudinal section of the bar, and each stack moves to a final transverse position in a third section of the bar.

8. A conductor bar as defined in claim 7 in which one of said sections is twice as long as each of the other two sections and the spacing between crossovers in said longer section is twice the spacing in the other two sections, whereby the strands of each stack are inverted in relative position at opposite ends of the bar and each strand occupies all positions in the bar for substantially equal distances.

9. A conductor bar as defined in claim 4 in which each stack of strands in an interior position changes places with a stack in an outside position in a first longitudinal section of the bar, the two outside stacks change places and the two inside stacks change places in a second section of the bar, and the stacks in interior positions each change places with a stack in an outside position in a third section of the bar.

10. A conductor bar as defined in claim 9 in which said second longitudinal section is twice as long as each of the first and third sections and the spacing between crossovers in the second section is twice the spacing in the first and third sections.

11. A conductor bar as defined in claim 4 in which one stack of strands in an outside position moves to the other outside position and each of the other three stacks moves to an adjacent position in a first longitudinal section of the bar, each stack in an outside position changes places with the adjacent stack in a second section of the bar, and an outside stack moves to the other outside position while each of the other stacks moves to an adjacent position in a third section of the bar, the direction of transverse movement of the stacks being opposite in the first and third sections.

12. A conductor bar as defined in claim 11 in which one of said sections is twice as long as each of the other two sections and the spacing between crossovers in said longer section is twice the spacing in the other two sections, whereby the strands of each stack are inverted in relative position at opposite ends of the bar and each strand occupies all positions in the bar for substantially equal distances.

* * * * *